Oct. 9, 1934.      O. E. FISHBURN      1,976,697
GEAR LOCK
Filed Nov. 14, 1932
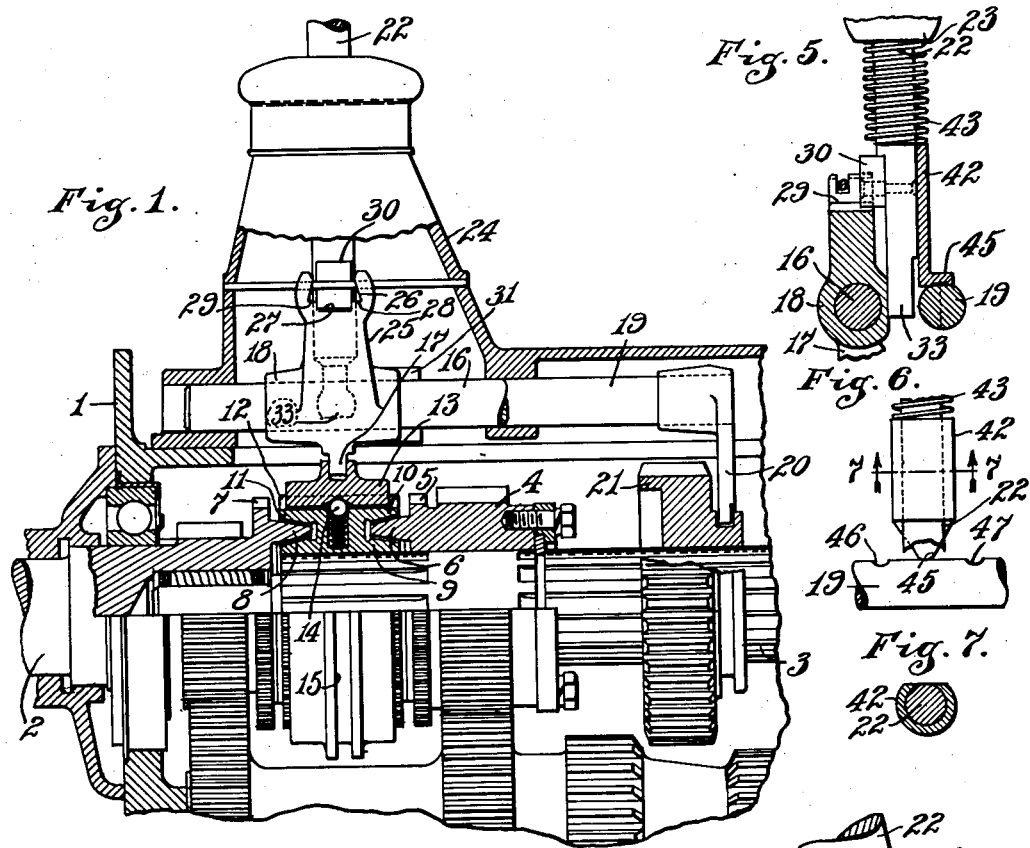
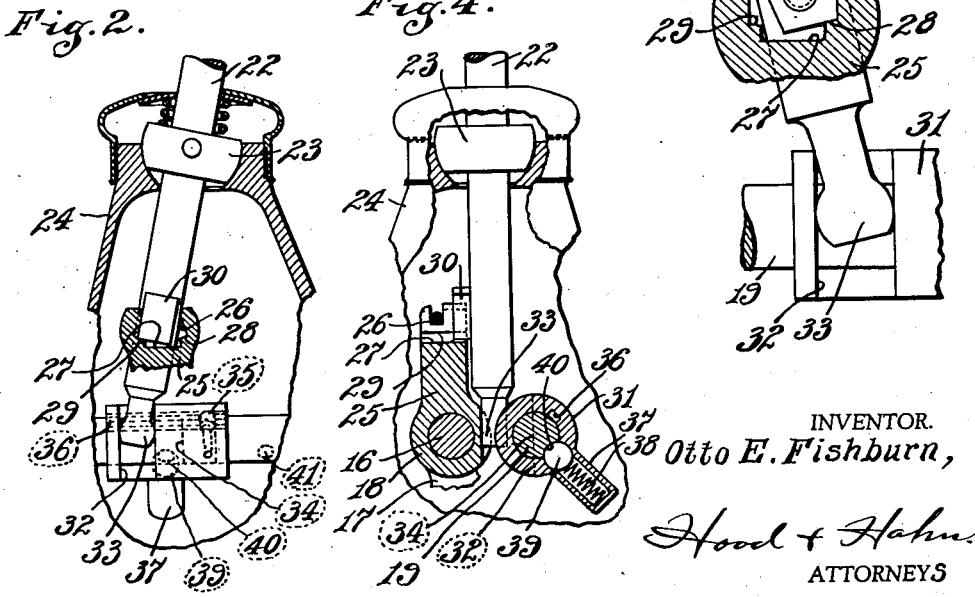
INVENTOR.
Otto E. Fishburn,
Hood + Hahn
ATTORNEYS Patented Oct. 9, 1934

1,976,697

UNITED STATES PATENT OFFICE 1,976,697

GEAR LOCK

Otto E. Fishburn, Muncie, Ind., assignor to Warner Gear Company, Muncie, Ind., a corporation of Indiana Application November 14, 1932, Serial No. 642,571

15 Claims. (Cl. 74—477)

My invention relates to improvements in automobile transmissions and is particularly directed toward means for preventing the transmission gears or clutches from becoming disengaged after they have been once shifted into driving position.

In certain types of transmissions I have found that after the transmission has been shifted into mesh there is a slight tendency on the part of the clutch or transmission gear, during travel, especially over rough roads, for the vibration to cause the gears or clutches to move out of mesh. In my present invention I have provided means embodied in the shifting mechanism for preventing such disengagement.

For the purpose of disclosing my invention I have illustrated certain embodiments thereof in the accompanying drawing, in which:

Fig. 1 is a side elevation, partly in section, of one embodiment of my invention;

Fig. 2 is a detail side elevation, partly in section, showing the shift mechanism in one position;

Fig. 3 is a detail view of a modified form of my invention;

Fig. 4 is a detail transverse section of the shift mechanism; and

Figs. 5, 6, and 7 are detail end, side, and transverse sectional views respectively of a modified form of means for preventing the shift lever from shaking out of its locking position.

The transmission with which I have chosen to illustrate my invention is of the type wherein the second speed gear is rotatively mounted on the driven shaft and a synchronizing clutch mechanism is provided for connecting the gear to the shaft. Synchronizing clutching mechanism is also provided for directly connecting the two shafts together for "high" speed drive. In this transmission there is provided the usual transmission casing 1 into which extends the driving shaft 2 and a driven shaft 3. The second speed gear 4, driven from the counter-shaft is rotatably mounted on the shaft 3 and is provided with clutch teeth 5 and one member 6 of a cone clutch. The shaft 2 is provided with clutch teeth 7 and one member 8 of a cone clutch. Interposed between the shaft 2 and the gear 4 and splined on the shaft 3 is a hub member 9 provided respectively with cone clutch members 10 and 11 for cooperation with the cone clutch members 6 and 8. The outer periphery of this hub member 9 is provided with radial teeth 12. Surrounding the hub member and provided with internal teeth, meshing with the teeth 12 is a clutch member 13. The hub member and the clutch member are resiliently connected by means of spring poppets 14 and the ring member is provided with an annular groove 15 to receive a shifting fork.

In operation when it is desired to shift into second speed, that is, connect the gear 4 with the shaft 3, the clutch member 13 is shifted to the right, looking at Fig. 1, thereby first engaging the cone clutch members 10 and 6 which will synchronize the gear 4 and shaft 3. This clutching engagement also offers sufficient resistance so that a continued pressure on the clutch ring 13 will disengage the spring poppets 14 to engage the clutch teeth of the ring 13 with the clutch teeth 5.

In order to shift into high speed the clutch ring 13 is shifted to the left thus first engaging the cone clutch members 11 and 8 and then engaging the clutch teeth of the member 13 with the teeth 7.

I have found that there is a tendency for the clutch ring 13 to disengage from the teeth 5 or the teeth 7. This ring is comparatively light and as a result the vibrations set up in the car sometimes has a tendency to cause the weight of the shift lever to move this ring back to neutral position. In order to overcome this objection I have provided an interlock for preventing any, except manual movement, of the shift rod controlling the clutch ring 13. The shift rod 16 is provided with a fork 17 mounted on a hub 18 and engaging in the groove 15 of the clutch member 13. A second shift rod 19 is provided with a shifting fork 20 for operating the gear 21 for low and reverse drive. These shift rods are shifted by means of the usual shift lever 22 universally mounted as at 23 in the cone extension 24 of the casing cover. The hub 18 for the fork 17 is provided with an upwardly extending arm 25 having a keystone shaped slot or notch 26 in its upper end, the bottom of this notch being extended into a restricted notch or recess 27 thereby forming shoulders 28 and 29. The shift lever 22, at a point above its lower end, is provided with a squared laterally extending lug 30 adapted, when shifted in the usual manner, to the left, viewing Fig. 4, to engage in the notch 26 and it will be noted that when the hub 18 is in the neutral position the suared lug 30 will extend into the extension notch 27. Shifting the lower end of the lever to the left, looking at Figs. 1 and 2, will shift the hub 18 to the left, looking at Fig. 1, and engage the teeth of the clutch 13 with the teeth 7 for "high" speed drive. This shifting movement will cause the bottom of the lug 30 to ride out of the extension notch 27 and bear against the forward side wall of the notch 26 with the front portion of the bottom edge of the lug 30 bearing on the shoulder 29. Therefore any tendency for the hub 18 to shift to the right, looking at Figs. 1 and 2, will be prevented by the pressure of the shoulder 29 on the bottom of the lug 30 and the shift rod is therefore effectually locked against shifting movement. However, when the lower end of the shift rod is shifted to the right, looking at Figs. 1 and 2, the lost motion between the sides of the notch 26 and the lug 30 will permit the bottom edge of the lug 30 to clear the shoulder 29 and the shifting movement may take place. The same action takes place in shifting the hub 18 to the right, looking at Figs. 1 and 2, except in this instance the shoulder 28 will become the locking shoulder.

In Fig. 3 I have illustrated a modification of my structure wherein the sides of the recess 26 are formed straight and the lug 30 is tapered toward the bottom. This permits an easier machining of the parts. Furthermore, the lug 30 is shown as a separate part secured to the shift lever by riveting or otherwise. This permits the lug to be formed of hardened steel to resist wear without the necessity of hardening the entire shift lever.

In some instances and with some constructions of shift levers I have found that with the lower end of the shift lever shifted to the right, looking at Figs. 1 and 2, that is, in second speed, the weight of the upper end of the lever under the influence of vibration set up in traveling over rough roads or the like may tend to shift the lower end of the lever out of its interlock position and to prevent this action I provide in addition to the above a resilient latch. The shift rod 19, which it will be remembered is the low and reverse speed shift rod is locked against movement by the usual interlock between the two shift rods when the shift rod 16 is shifted out of neutral position. On this shift rod 19 I mount a sliding sleeve 31 which has in its side a notch or cut-out portion 32 into which may extend the lower end 33 of the shift lever 22. This groove or notch extends clear through the sleeve and when the shift lever 22 is in neutral position it is opposite an engaging notch 34 in the shift rod 19. The sleeve is prevented from rotation on the shift rod 19 by means of a pin 35 extending into a keyway 36 in the interior of the sleeve. This sleeve is provided with an extension 37 forming a pocket for the reception of the operating spring 38 of a spring pressed poppet 39. The shift rod 19 is provided with a pair of positioning notches 40 and 41 into which the poppet will engage when the sleeve is shifted into certain predetermined positions. When the shift rod is shifted from neutral, and operates the hub 18 the lower end of the rod is engaging only in the slot 32 of the sleeve 31. Therefore this sleeve will slide on the rod 19 and when the lower end of the lever has been shifted to the limit, either forwardly or backwardly, in its movement, the poppet will snap into either the notch 40 or 41, thus providing a resilient latch for holding the shift lever against movement. If, however, the lower end of the shift lever is shifted to the right, looking at Fig. 4, when the parts are in neutral position, the lower end will move through the slot 32 in the sleeve and engage in the slot 34 in the shift rod and the shift rod and sleeve will be moved in unison.

While I have shown the resilient latch mechanism for holding the shift lever against unintended movement in connection with the interlock of the fork 25 it will be understood that either one of these two locking mechanisms may be used independently.

The usual interlock between the rails 16 and 19 which prevents the shifting of one rail when the other has been shifted is provided. Therefore with the rail 16 shifted to operate the transmission either in "high" or "second" the rail 19 would be locked against movement and held stationary.

In Figs. 5, 6, and 7 I have shown a modified structure for preventing the vibrations from shifting the lever 22 so that the projection 30 will be moved out of interlocking engagement with the shoulders 29 or 28. In this structure the shift lever 22 is provided with a sleeve 42 biased in its lowermost position by means of a coiled spring 43 interposed between the top of the sleeve 42 and the trunnion 23 extending through the shift rod. The lower end of this sleeve 42 is provided with a foot 45 adapted to extend over and make sliding engagement with the top of the shift rod 19. This shift rod is provided with a pair of notches 46 and 47, respectively, into which the foot 45 takes or engages when the shift lever shifts the member 18 to the limit of its forward or backward movement. This resilient engagement of the foot 45 in the notches 46 and 47 operates in substantially the same manner as the resilient engagement of the ball 39 in the recesses 40 and 41. That is, it provides a readily disengageable friction lock which prevents the shift lever from moving under vibrations or jolts out of its locking position. At the same time the resistance offered by this resilient lock to the movement of the shift lever is so slight as to be practically imperceptible to the operator in shifting the lever.

I claim as my invention:

1. In a transmission, the combination with a shiftable transmission member, of shifting means therefor, a shift lever for said shifting means operatively connectible thereto to move said shifting means in either direction, said shift lever and shift means having portions mutually engageable and by said engagement locking said shifting means against movement in either direction and disengaged by the movement of said shift lever in moving said shift means.

2. In a transmission, the combination with a shiftable transmission member, of shifting means therefor, a shift lever movable into operable connection therewith to move said shift means, said shift lever and shift means having portions mutually engaged when said shifting means is moved to the limit of its shifting movement and by said engagement locking said shifting means against movement and releasable by the movement of said shift lever to shift said shift means.

3. In a transmission, the combination with a shiftable transmission member, of shifting means therefor, a shift lever operatively connectible therewith to move said shifting means, said lever and shifting means having portions mutually engaged by the movement of said shift lever in one direction and by said engagement locking said shift means against movement and disengaged by the movement of said shift lever in moving said shift means in the opposite direction.

4. In a transmission, the combination with a shiftable transmission member, of a shift fork therefor, and a shift lever for operating said fork, a member connected to said shift fork operatively engageable by said lever to shift said fork and having a portion mutually engaged with said lever at the end of the shifting movement of the shift fork in one direction for locking said shift fork against movement and disengaged from said lever when the lever is shifted in the opposite direction to move said shift fork.

5. In a transmission, the combination with a shiftable transmission member, of a shift fork therefor, a shift lever for operating said fork, and a stop on said fork movable beneath a portion of said lever, by the shifting of the fork, to engage said portions and prevent a shifting of said fork by means other than said lever.

6. In a transmission, the combination with a shiftable transmission member, of a shift fork for said member, a shift lever, and a stepped arm on said fork engaged by a portion of said lever to shift the fork, a step in said arm being adapted to be moved beneath a portion of said lever by the shifting of the fork to prevent movement of the fork by means other than said lever.

7. In a transmission, the combination with a shiftable transmission member, of a shift fork therefor, a shift lever for operating said fork pivoted to swing its lower end in an arc, and a vertically stationary stop on said fork movable beneath a portion of said lever when said portion is swung beyond the lowermost point of the arc.

8. In a transmission, the combination with a shiftable transmission member, of a shift fork for shifting the same, a shift lever for operating said fork, a U-shaped recess in said fork having shoulders in the side walls of said fork extending at angles to said walls, an arm on said shift lever engaging in said recess for shifting said fork, said shoulders being movable beneath said arm when the fork is shifted to the limit of its shifting position in either direction.

9. In a transmission, the combination with a shiftable transmission member, of a shift rail, a shift fork for operating said shiftable member, a shift lever mounted to permit its lower end to swing into two vertical planes substantially at right angles to one another, means on said shift rail engaged by the lower end of said shift lever for moving said rail, means on said shift rail movable therewith when the rail is moved and independently thereof when the lever is out of engagement with the rail and is shifted, and resilient means for connecting said means to the rail when the lever has been shifted to the limit of its movement.

10. In a transmission, the combination with a shiftable transmission member, of a shift fork therefor, a shift rail, a shifting lever for operating said shift fork, a sleeve on said shift rail having a slot therethrough permitting the engagement of said shift rail by said lever to shift said rail and normally adapted to receive the shift lever when out of engagement with said shift rail, and a resilient lock member for resiliently connecting said sleeve to said rail when the shift lever is moved to a predetermined position.

11. In a transmission, the combination with a shiftable transmission member, of shifting means therefor, a shift lever for said shifting means, locking means engaging said shift means to lock the same against movement which locking means permits said shift lever to move said shifting means in either direction while locking said shifting means against movement except by said lever, and resiliently held latching means for said lever directly engaging the lower end of said lever and releasable by the shifting movement of the lever in a direction to shift said transmission means.

12. In a transmission, the combination with a shiftable transmission member, of a shift fork for shifting the same, a shift lever for operating said fork, a U-shaped recess in said fork having shoulders in the side walls thereof and extending at angles to said walls, an arm on said shift lever engaging in said recess for shifting said fork, said shoulders being movable beneath said arm when the fork is shifted to the limit of its shifting position in either direction, and resilient latching means for holding said shift lever in either of its shifted positions.

13. In a transmission, the combination with a shiftable transmission member, of shifting means therefor, a shift lever for operating said shifting means, latching means for locking the shifting means in its shifted position, a lost motion connection between said shift lever and shifting means causing a release of the latching means by the initial movement of the shift lever to move the shifting means in a reverse direction, and spring latched retaining means for retaining said shift lever in its shifted position directly engaging the lower end of said shift lever and releasable by the shifting movement of the lever during the lost motion thereof in a direction to shift said transmission member.

14. In a transmission, the combination with a shiftable transmission member, of a shift fork for shifting the same, a shift lever for operating said fork, a U-shaped recess in said fork, an arm on said shift lever engaging in said recess for shifting said fork, said U-shaped recess constructed to provide a lost motion connection between said arm and said shifting fork to permit a continued movement of the shift lever independent of said fork when the lever is shifted in a reverse direction, and means for locking said fork against movement except by said shift lever rendered inoperative by said continued movement of said shift lever.

15. In a transmission, the combination with a shiftable transmission member, of a shift fork for shifting the same, a shift lever for operating said fork, a U-shaped recess in said fork, and an arm on said shift lever engaging in said recess for shifting said fork, said U-shaped recess constructed to provide a lost motion connection between said arm and the side walls of the fork to permit a lost motion between the arm and recess when the shift lever is moved in a reverse direction, means for locking said fork against movement except by said lever rendered inoperative by said lost motion movement of the shift lever, and resilient retaining means for retaining said shift lever in its shifted position.

OTTO E. FISHBURN.